April 28, 1925.

F. H. AUSTIN 1,535,892

ICE CUTTING MACHINE

Filed July 14, 1923    3 Sheets-Sheet 1

Fred H. Austin
INVENTOR

WITNESSES
Louis Gordman
E. N. Lovewell

BY

ATTORNEY

April 28, 1925.
F. H. AUSTIN
ICE CUTTING MACHINE
Filed July 14, 1923
1,535,892
3 Sheets-Sheet 2
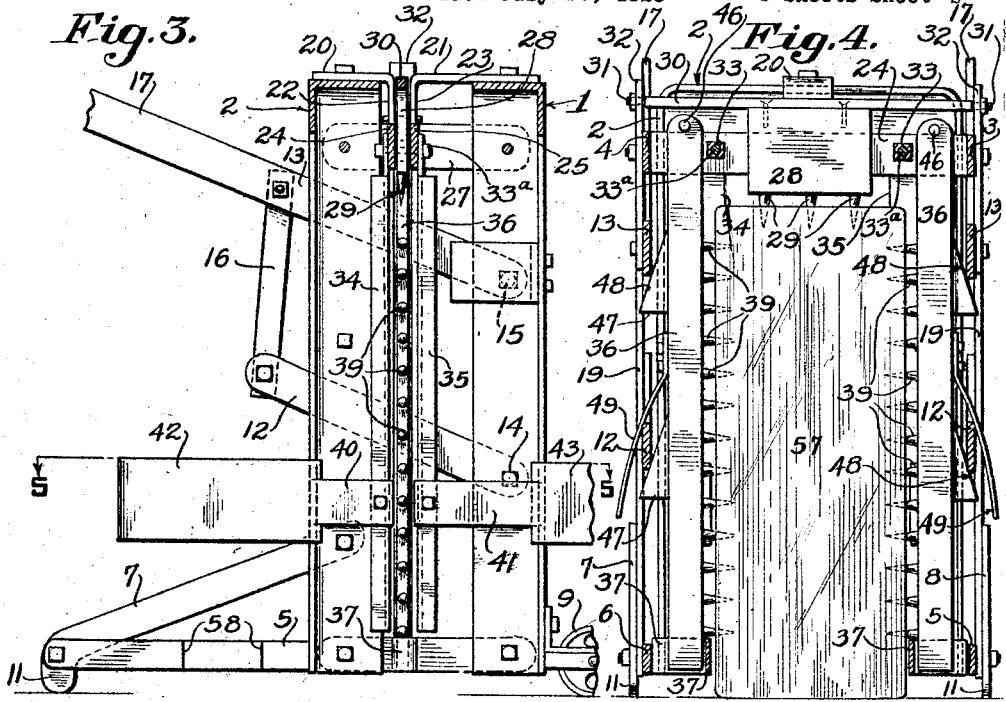
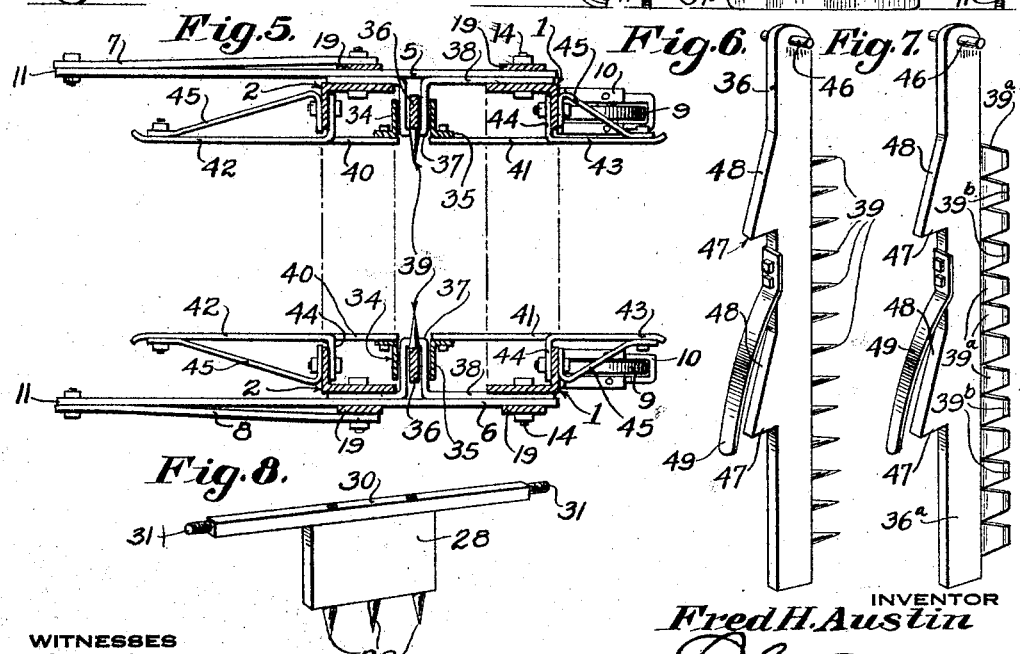
WITNESSES
Louis Goodman
E. N. Lovewell
INVENTOR
Fred H. Austin
BY
ATTORNEY April 28, 1925.　　　　　F. H. AUSTIN　　　　1,535,892
ICE CUTTING MACHINE
Filed July 14, 1923　　　3 Sheets-Sheet 3
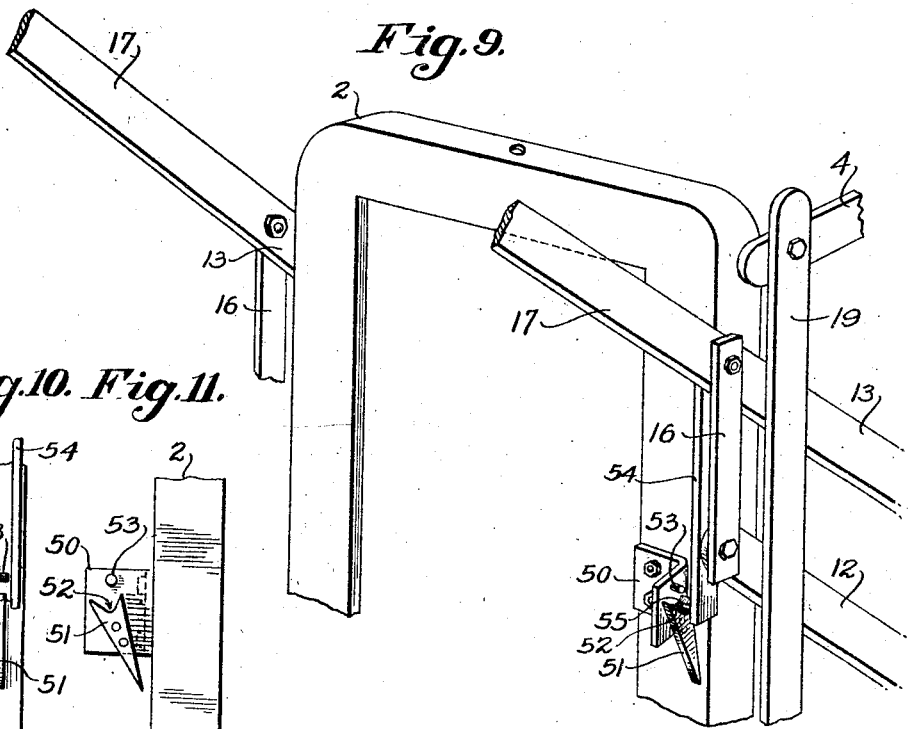
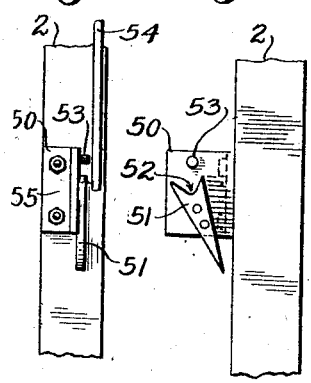
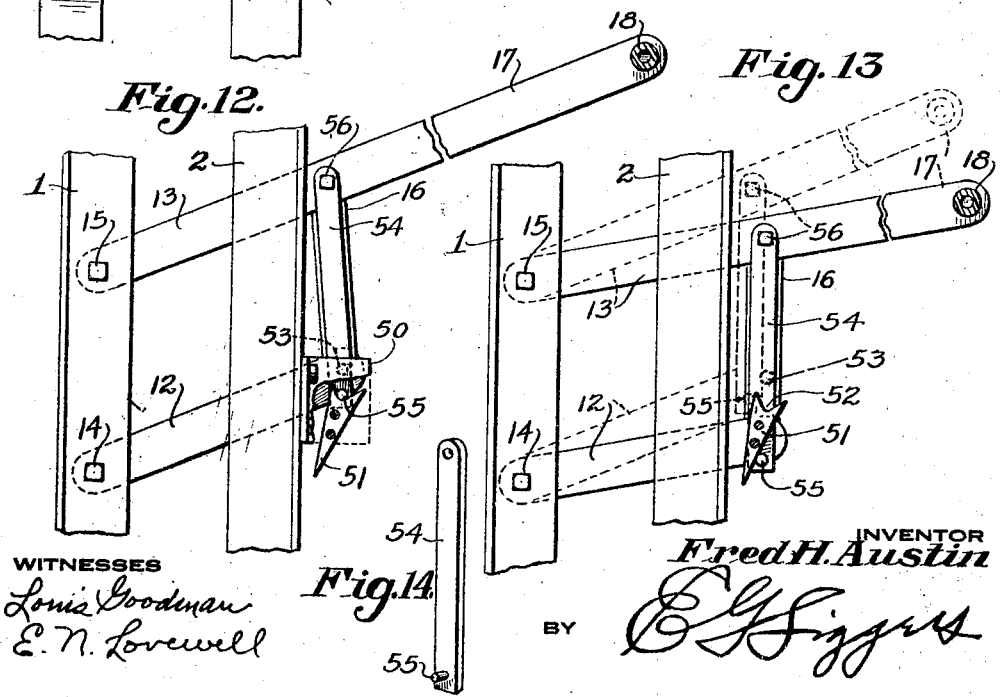
WITNESSES
Louis Goodman
E. N. Lovewell
INVENTOR
Fred H. Austin
BY
ATTORNEY Patented Apr. 28, 1925.

1,535,892

UNITED STATES PATENT OFFICE.

FREDERICK H. AUSTIN, OF GREENEVILLE, TENNESSEE.

ICE-CUTTING MACHINE.

Application filed July 14, 1923. Serial No. 651,635.

*To all whom it may concern:*

Be it known that I, FREDERICK H. AUSTIN, a citizen of the United States, residing at Greeneville, in the county of Greene and State of Tennessee, have invented a new and useful Ice-Cutting Machine, of which the following is a specification.

This invention relates to an ice cutting machine, which is adapted especially for cutting or breaking blocks of ice into small pieces for retail trade.

The general object of the invention is to provide a machine by which the blocks of ice may be quickly and accurately cut or broken into the desired sizes, with a minimum amount of waste.

A more specific object is to provide improved means for advancing and retracting the cutters in coordination with each other, and in such a manner that the block may be easily separated into the desired sizes with accuracy, and with a small expenditure of power.

Another object is the provision of a latch for automatically catching and supporting the operating lever in order to further facilitate the cutting operation, the latch being automatically releasable by the manipulation of the lever at the beginning of the next operation.

The specific details of construction by means of which the different objects are attained will be more fully explained in the following detailed description taken in connection with the accompanying drawings, which illustrate the preferred form of the invention.

In the drawings:

Figure 3 is a vertical section taken on the line 3—3 of Figure 2.

Figure 4 is a vertical section taken on the line 4—4 of Figure 1.

Figure 5 is a horizontal section taken on the line 5—5 of Figure 3.

Figure 6 is a detail perspective view of one of the side cutters.

Figure 7 is a similar view of a modified form of cutter.

Figure 8 is a detail perspective view of the top cutter.

Figure 9 is a perspective view of a portion of the machine illustrating particularly the latch and switch.

Figure 10 is a front elevation of the latch and switch with a portion of the supporting frame.

Figure 11 is a side elevation of the switch and a portion of the supporting frame.

Figure 12 is a side elevation of a portion of the frame together with the actuating levers and the latch and switch.

Figure 13 is a view similar to Figure 12, but showing the parts in different positions.

Figure 14 is a detail perspective view of the latch.

Figure 1:
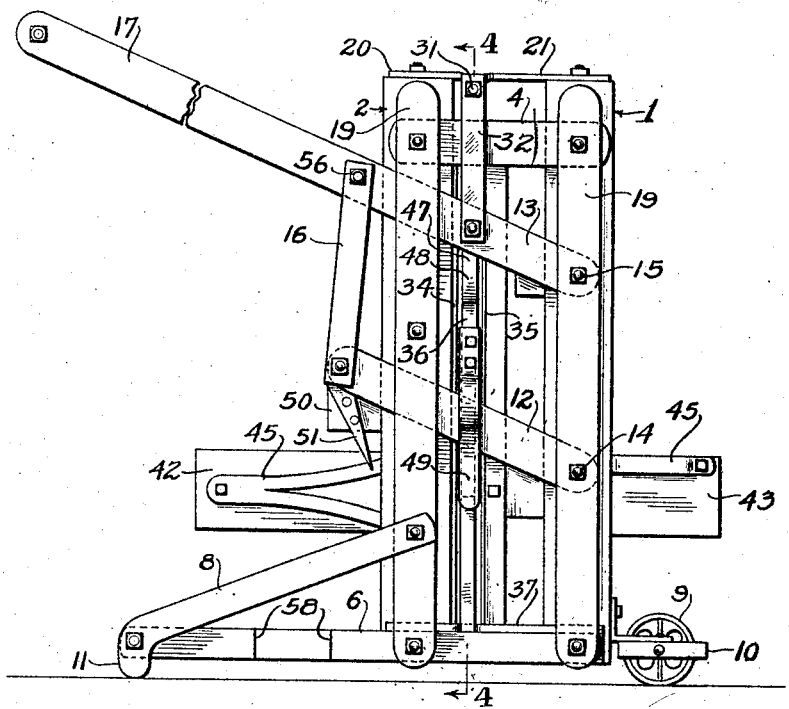
Figure 1 is a side elevation of the machine embodying my invention.
Figure 2:
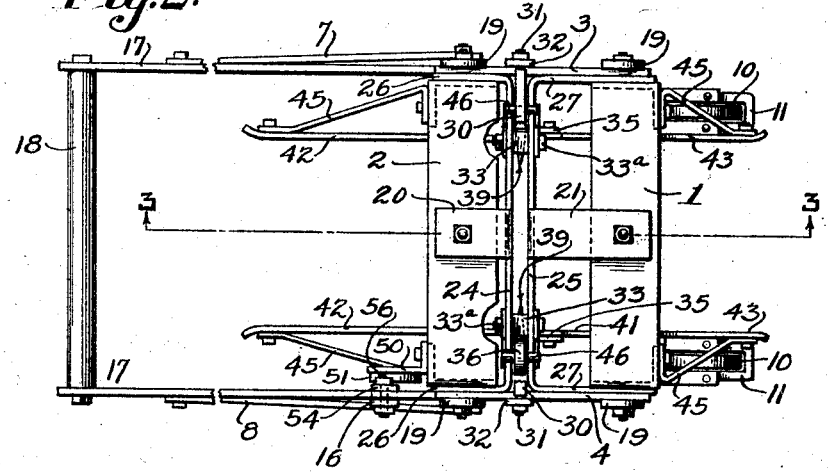
Figure 2 is a plan view thereof with the top cutter broken away.

The frame of the machine includes a pair of inverted U-shaped frame members 1 and 2, held rigidly in parallel spaced relation by a pair of spacing bars 3 and 4 secured to their upper ends, and by a pair of bars 5 and 6 connecting their legs at the lower ends, the forward ends of the bars 5 and 6 being extended forwardly and connected to the frame member 2 by braces 7 and 8, respectively. The rear side of the frame is preferably supported by rollers 9, which are mounted in yokes 10 secured to the legs of the frame member 1. The frame is supported at its forward side by feet 11, which may be formed as a prolongation of the braces 7 and 8, respectively.

The operating mechanism of the machine includes pairs of levers 12 and 13 pivotally connected at their rear ends, as at 14 and 15, to the legs of the frame member 1, and held in parallel relation to each other by the links 16. One pair of levers, as 13, are extended beyond the connection with the link 16, as shown at 17, and connected at their forward ends by a suitable handle 18. The levers 12 and 13 are held against lateral movement, and guided in their movement up and down about the pivots 14 and 15 by the guide straps 19.

Secured to the upper faces of the frame members 2 and 1, and extending inwardly therefrom, are a pair of brackets 20 and 21 having downturned opposed faces 22 and 23, which extend transversely across the machine, as shown at 24 and 25, and having rearwardly turned ends 26 and 27 secured to the sides of the frames 2 and 1, respectively. The faces 24 and 25 of these brackets are thus rigidly supported and form a vertical guideway, in which the upper cutter 28 is adapted to reciprocate. This cutter includes a series of downwardly extending prongs 29, and is carried by a transversely extending horizontal bar 30 having its ends 31 suitably secured to the upper ends of a pair of links 32, the lower ends of the links being pivotally connected to the pair of levers 13, and actuated thereby to reciprocate the cutter. The faces 24 and 25 of the guide brackets are further held in suitably spaced relation by a pair of spacing blocks 33, carried by bolts 33ª.

A pair of vertical guide bars 34 and 35 are located at each side of the machine and are supported at their upper ends by the bolts 33ª, and form guideways between which the side cutters 36 are guided in their lateral reciprocating movement, which is effected by the levers 12 and 13 in a manner hereinafter described. The lower ends of the side cutters 36 are guided in U-shaped portions 37 of longitudinal side straps 38 secured to the longitudinal frame members 5 and 6, respectively. The guide bars 34 and 35 are secured near their lower ends to the inwardly extending ends 40 and 41 of opposed guide brackets 42 and 43, which extend longitudinally across the inner sides of the frame members and define the space within which the block of ice is placed prior to the cutting operation. The brackets 42 and 43 are braced from the frame members 2 and 1 by the respective brace members 45, and by the inturned tongues 44.

The side cutters 36, which carry series of cutting elements 39 are adapted to be reciprocated transversely toward or away from each other between the guide bars 34 and 35. Each of these cutters 36 is provided at its upper end with a transversely extending pin 46, which rests on the upper side edges of the guide bars 24 and 25, while the cutter is moved outwardly or inwardly. For effecting this lateral motion of each cutter, the latter is provided with a pair of cams 47 having inclined edges 48, which form small acute angles with the vertical side of the cutter 36, and which are engaged by the respective levers 12 and 13 as the latter descend to force the cutter inwardly. A spring 49 is secured to the cutter 36, and is engaged by the upper edge of one of the levers, as 12, when the latter returns, whereby the cutter is moved outwardly again to its normal position.

The switch and latch mechanism will now be described. A small bracket 50 is secured to one side of the frame member 2, and rigidly supports a wedge shaped switch 51, which is slightly inclined upwardly and outwardly from the member 2. The switch member 51 has a V-shaped notch 52 in its upper end above which is a pin 53. The latch member 54 is pivotally connected to the extension 17 of the lever 13, and carries a pin 55 at its lower end. The pivotal point 56 of the latch 54, when the lever 13 is raised, is slightly inside a vertical line passing through the inner edge of the notch 52. The latch 54, therefore, swings inwardly so that as the lever is lowered the pin 55 rides downwardly on the inner edge of the switch 51. The lower end of the switch, however, is inside of the center of gravity of the latch, and when the lever reaches its lowermost position, the lower end of the latch swings outwardly past the lower end of the switch, and as the lever is raised to retract the cutters, the pin 55 rides upwardly past the upper outer point of the switch and drops into the notch 52, and thereby latches the lever in its raised position with the cutters retracted preparatory to another operation. When the block of ice is in position to be cut again, the lever 13 is slightly raised so as to permit the pin 55 to swing upwardly between the inner edge of the notch and the pin 53 into position for another operation to begin.

In Figure 7, I have shown a modified form of cutter 36ª, with teeth 39ª, each having a cutting edge 39ᵇ, which may be used in place of the sharp pointed teeth 39.

In using the invention the machine may be readily moved over the floor on the feet 11 and rollers 9 until it straddles a block of ice, as indicated at 57, in Figure 4. The machine is preferably constructed of such dimensions as to receive a three-hundred pound block of manufactured ice when resting on its side edge, and the points of the prongs 39 and 29 when retracted will be ready to engage the ice upon depression of the handle 18. The extremities of the brackets 42 are preferably at such a point that if the end of the block of ice is flush therewith, the cutters will sever a one-hundred pound piece. This piece may then be turned on its side and cut into fifty pound pieces, each of which may, in turn, be cut into twenty-five pound pieces by the side cutters. Marks, as indicated at 58, may be provided on the side bars 5 and 6 for gaging the twenty-five and fifty pound pieces.

After the block has been properly positioned, the initial movement of the levers 12 and 13 will first cause the prongs 39 to engage the sides of the block, and a further movement will cause the prongs 29 of the top cutter to engage the block of ice. This sequence of operations is on account of the relatively slow movement of the side cutters, which is caused by the engagement of the levers 12 and 13 with the inclined edges 48. After the block has been severed, a return of the levers to their initial positions will cause a retraction of the cutters, as will be readily understood, and the levers will be held by the latch 54 while the machine is arranged for the next cutting operation.

From the foregoing description it will be seen that the block of ice may be quickly and accurately cut into desired sizes. All that is necessary for the operator to do is to properly position the block relatively to the machine, and then operate the handle 18. Upon raising the handle again, the cutters are retracted and the handle is automatically latched in its raised position.

While I have described the operation with reference to a block of manufactured ice of the usual size, it is to be understood that the machine may be constructed in different shapes and sizes, and that many modifications may be made in the specific structural details of the machine without departing from the salient features of the invention or sacrificing any of the advantages thereof. It is, therefore, my intention to include all such modifications within the scope of the appended claims.

What is claimed is:—

1. In a machine of the class described, a frame adapted to straddle a block of ice, severing elements arranged at the top and sides of the frame with the top cutting edge perpendicular to the side cutting edges, and means for moving all of said elements simultaneously toward the center of the machine to sever a block of ice positioned therein, while maintaining the perpendicular relation between said cutting edges.

2. In a machine of the class described, a frame adapted to straddle a block of ice, independent severing elements arranged across the top and at the sides of the frame, with the edge of the top cutter perpendicular to the edges of the side cutters, a system of levers pivoted to swing vertically in the frame, and means for connecting said levers to each of said severing elements to cause the latter to move simultaneously toward the center of the machine to sever a block of ice positioned therein, while maintaining the perpendicular relation between the cutting edges.

3. In a machine of the class described, a frame adapted to straddle a block of ice, severing elements arranged in perpendicular relation to one another and movable toward or from the block of ice, a system of parallel levers pivoted to swing vertically in the frame, means operable by a downward movement of the levers to move said severing elements simultaneously inwardly while maintaining the perpendicular relation between them, and operable by an upward movement of the levers to retract said elements.

4. In a machine of the class described, a frame adapted to straddle a block of ice, horizontal and vertical severing elements movable toward or from the block of ice, a system of parallel levers pivoted to swing vertically in the frame, means operable by the levers upon their downward movement to move all of said severing elements simultaneously inwardly in such a manner that all points thereof move perpendicularly to the opposed face of the block, said means being operable by the levers upon their upward movement to retract said elements, and means including a gravity latch automatically operable to hold the elements in retracted position.

5. In a machine of the class described, a frame adapted to receive a block of ice, severing elements guided in said frame and arranged parallel respectively to the top and side faces of a block of ice contained in the frame, a system of levers pivoted to the frame to swing in vertical planes, means operable by the levers upon movement in one direction to move all of said elements simultaneously inwardly to sever the block of ice and operable by the levers upon movement in the opposite direction to retract said elements, and a gravity latch automatically operable to latch the levers with said elements in retracted position.

6. In a machine of the class described, a frame adapted to straddle a block of ice, severing elements arranged at the sides of the frame and guided therein for rectilinear reciprocation toward and away from a block of ice contained therein, cams secured to the severing elements, and a system of levers pivoted to the frame in rear of said elements so as to swing downwardly into engagement with said cams to force the elements inwardly.

7. In a machine of the class described, a frame adapted to straddle a block of ice, severing elements arranged at the top and sides of the frame and guided therein for rectilinear reciprocation toward and away from a block of ice contained therein, cams secured to the side severing elements, a system of levers pivoted to the frame in rear of the side severing elements so as to swing downwardly into engagement with said cams to force said side severing elements inwardly, and links connecting the levers to the top severing elements to move the latter downwardly in coordination with the movement of the side severing elements.

8. In a machine of the class described, a frame including inverted U-shaped members adapted to straddle a block of ice, side members rigidly connecting the U-shaped members, severing elements arranged at the top and sides of the frame, means for moving all of said elements simultaneously toward the center of the machine to sever the block of ice positioned therein, and means on said side members to gage the position of the block with respect to the frame, so that it will be accurately severed into smaller blocks of commercial size.

9. In a machine of the class described, a frame, pairs of opposed guide members at the top and sides of the frame, severing elements guided for outward and inward movement between the respective pairs of guide members, and a system of levers pivoted to swing vertically in the frame, means operable by a downward movement of the levers to move said elements simultaneously inwardly, and operable by an upward movement of the levers to retract said elements.

10. In a machine of the class described, a frame including a pair of inverted U-shaped members rigidly connected in parallel relation, said frame being supported at one end by a pair of rollers and at the other end by a pair of feet, pairs of opposed guide members at the top and sides of the frame, severing elements guided for outward and inward movement between the respective pairs of guide members, and a system of levers pivoted to swing vertically in the frame, means operable by a downward movement of the levers to move said elements simultaneously inwardly, and operable by an upward movement of the levers to retract said elements.

11. In a machine of the class described, a frame adapted to receive a block of ice and having pairs of vertically spaced guide bars at opposite sides thereof forming transverse slots between them, vertical severing elements loosely mounted in the slots and having pins at their upper ends resting on the guide bars for supporting said elements, a system of levers pivoted to swing vertically in the frame, and means operable by a downward movement of the levers to move said severing elements simultaneously inwardly and operable by an upward movement of the levers to retract said elements.

12. In a machine of the class described, a frame adapted to receive a block of ice and having cooperating vertical severing elements mounted in opposite sides thereof, a system of connected levers pivoted to swing in vertical planes, cams on said elements engageable by the levers upon their downward movement to move the severing elements inwardly, means engageable by the levers upon their upward movement to retract said elements, and a gravity latch pivoted at its upper end to one of the levers and depending therefrom and automatically operable to latch the levers as they are returned to raised position after the severing operation.

In testimony, that I claim the foregoing as my own, I have hereto affixed my signature.

FREDERICK H. AUSTIN.